Patented Oct. 20, 1953

2,656,311

UNITED STATES PATENT OFFICE 2,656,311

STABILIZATION OF PHENOL ALKYLATES

Donald R. Stevens, Wilkinsburg, and Samuel C. Camp, Richland Township, Allegheny County, Pa., assignors to Gulf Research & Development Company, Pittsburgh, Pa., a corporation of Delaware No Drawing. Application October 31, 1949, Serial No. 124,721

5 Claims. (Cl. 202—57)

This invention relates to the stabilization of phenol alkylates, and it is particularly concerned with a method of inhibiting the dealkylation of alkylated phenols when they are subjected to temperatures normally causing dealkylation.

Phenol or its homologs, such as the cresols, xylenols, and ethyl phenols, are readily alkylated with olefins, particularly the tertiary olefins (olefins capable of forming tertiary alcohols on hydration) in the presence of a catalyst such as sulfonic acids; sulfuric acid; alkyl esters of sulfuric acid; aluminum chloride; hydrogen chloride; zinc chloride; boron trichloride; boron trifluoride; complexes of boron trihalides with water, ethers, alcohols, etc.; and phosphoric acid. The resulting crude alkylate, however, is acidic and will tend to undergo dealkylation at elevated temperatures unless the acid component is removed or its dealkylation-promoting tendency is inhibited. For example, when a mixture of meta- and para-cresol is alkylated with the isobutylene of a C4 refinery gas cut in the presence of sulfuric acid, the resulting crude alkylate usually contains a mixture of mono- and di-tertiary-butyl para-cresol, and mono- and di-tertiary-butyl meta-cresol, together with some extraneous non-phenolic acidic materials such as sulfuric acid, mono-tert-butyl sulfate, mono-sec-butyl sulfate, di-sec-butyl sulfate, sulfonic acids, sulfones, and the like. The di-tertiary-butyl para-cresol is particularly useful as an antioxidant in petroleum products such as cracked gasoline, lubricating and insulating oils, greases, and the like. The di-tertiary-butyl meta-cresol is useful in the reclaiming of rubber, as a tackifier, and in the preparation of surface active agents, and also in a useful starting material in processes of chlorination, nitration, hydrogenation, vinylation, sulfurization, aldehyde condensation, and the like. The mono-tertiary-butyl cresols may be treated with sulfur dichloride to form rubber stabilizers or they can be recycled for further alkylation. Accordingly, it is desirable to fractionate the crude alkylate to obtain cuts predominating in a single phenolic compound.

Before the crude alkylate is fractionated, however, it must be stabilized against dealkylation because the non-phenolic acidic materials present in the alkylate act as dealkylation catalysts even at the temperature required for vacuum distillation. Stabilization of the alkylate is important, of course, not only when the alkylate is subjected to fractional distillation but also when the alkylate is subjected to temperatures normally causing dealkylation in the presence of small amounts of acidic materials. Such temperatures are often encountered when the alkylate is used as a chemical intermediate.

In the past it has been customary to stabilize the alkylate by washing it with a dilute aqueous alkali solution such as an aqueous 5 to 10 per cent solution of sodium hydroxide and, if necessary, with water at ordinary temperatures. According to one stabilization procedure the alkylate was washed with a dilute aqueous alkali solution at a temperature above about 100° C. under superatmospheric pressure. While washing the alkylate with an aqueous 5 to 10 per cent solution of sodium hydroxide and with water at ordinary temperatures partially stabilizes the alkylate in that it removes the easily neutralizable materials such as sulfuric acid, mono-tert-butyl sulfate, mono-sec-butyl sulfate, and the sulfonic acids, it does not remove or inhibit the dealkylation-promoting tendency of the more refractory materials such as di-sec-butyl sulfate and the sulfones. Washing the alkylate with an aqueous 5 per cent solution of alkali at a temperature above 100° C. under superatmospheric pressure produces an alkylate which is more stable against dealkylation than one which has been washed at ordinary temperatures and pressures. However, the alkylate obtained even by this more drastic washing treatment is not completely stabilized in that it will dealkylate when heated to ordinary dealkylating temperatures or temperatures approximating its boiling point.

We have found that an alkylate stabilized against dealkylation at elevated temperatures can be obtained by adding to the crude alkylate at least 1.5 times the stoichiometric quantity of an alkali metal phenate necessary to neutralize the extraneous non-phenolic acidic matter in said alkylate. We have found that for complete stabilization of the alkylate the phenate should be used in an amount corresponding to at least about 1.5 times the stoichiometric quantity necessary to effect neutralization as calculated from the saponification number (ASTM D94–41T). More than 1.5 times and as much as about 2 times the theoretical amount or more can be used, but from an economic standpoint it is not desirable to use more than the least amount required to effect complete stabilization. We have found that less than about 1.5 times the theoretical amount does not effect complete stabilization.

For purposes of determining the stoichiometric amount of alkali metal phenate required, we have resorted to the use of the saponification number test (ASTM D94–41T) commonly used for determining the saponifiable material in animal, vegetable or mineral oils. The saponification number, however, does not necessarily give an accurate indication of the amount of the non-phenolic acidic material present in an alkylated phenol. For example, if phenol itself is alkylated, a portion of the alkylated product may react with the caustic potash used in carrying out the saponification number test with the result that a higher saponification number would be obtained. In general, however, the increase in the saponification number resulting from the reaction of the phenolic material with the alkali is so small that it can be disregarded. It should be understood, however, that the stoichiometric amount of phenate required should be based upon the amount theoretically required to neutralize the extraneous non-phenolic acidic material in the alkylate.

In the practice of our invention we can use the alkali metal salt of a phenol including phenol itself and its homologs, such as ortho-cresol, meta-cresol, and para-cresol, or mixtures of these such as are found in commercial cresylic acid, xylenols, ethyl phenols, propyl phenols, nonyl phenols, and the like. We customarily employ the phenate corresponding to the phenol from which the crude alkylate was originally produced. The method of preparing the alkali metal salt of a phenol is not critical. When employing sodium cresylate, we have obtained equally good results from sodium cresylate prepared in the following ways:

(1) By treating a 60–40 mixture of meta- and para-cresol with the theoretical amount of 20 per cent aqueous NaOH, and evaporating to dryness in an atmosphere of nitrogen at 110° to 120° C.

(2) By refluxing theoretical quantities of metallic sodium and a re-distilled commercial meta-para-cresol mixture in xylene until the sodium disappeared, then removing the xylene by vacuum distillation.

(3) By mixing theoretical quantities of meta-cresol and 50 per cent NaOH, and using the resulting moist crystalline mass. Corrections were made, of course, for moisture content in determining the amount to be used.

The exact manner in which the alkali metal salt of a phenol functions in stabilizing the alkylate is not certain; therefore, we do not wish to limit our invention with respect to theory. It is believed, however, that the stabilizing efficiency of the phenol compounds depends to some extent upon their solubility in the alkylate, thus bringing the phenate and the residual acidic material into the same phase. Although the net result of their action on an alkylate should be equivalent to complete neutralization, it is not certain that this condition has actually been brought about. Therefore, in referring to the treated alkylate we prefer to call it a stabilized alkylate rather than a neutralized alkylate.

Stabilization of the alkylate can be carried out either at room temperature or at an elevated temperature below the normal dealkylation temperature. When stabilizing crude acidic butylated cresols, we have obtained good results when employing a temperature of about 90° to 95° C. The time required for stabilization depends upon the character of the acid components and the intimacy of the contacting of the alkylate and the phenate. Batch operations with moderate stirring may require as much as 30 minutes. However, under optimum contacting conditions the time required may be considerably reduced. In certain instances, such as in batch distillation operations and in continuous distillation operations where the heating is gradual and adequate contacting is effected, the phenate may be added directly to the crude alkylate and charged to the distillation unit without a separate treating step. For instance, in the batch distillation of an alkylated phenol reaction mixture, the reaction mixture may be introduced into a stillpot along with a suitable quantity of alkali metal phenate. The reaction mixture and the alkali metal phenate may then be agitated while the temperature of the contents in the stillpot is gradually raised to effect fractional distillation.

The effectiveness of the alkali metal phenates in inhibiting the dealkylation of alkylated phenols may be demonstrated by means of the following dealkylation test in which a given amount of a treated phenol alkylate is subjected to fixed dealkylation heating conditions so that the results in a series of tests are directly comparable.

In carrying out this test, 10 grams of treated alkylate are placed in a glass chamber of about 50 milliliter capacity surrounded by a bath of vapors from boiling nitrobenzene. The chamber is connected through a condenser to a gasometer filled with saturated salt water for collecting the gas evolved. In this way the extent of the dealkylation occurring is indicated by the volume of gas collected in the gasometer, which corresponds to the volume of salt water displaced. In this test the alkylate is heated at about 205° C. for two hours, and the volume of gas collected at the end of 30, 60 and 120 minutes is noted and recorded. The recorded figures thus give numerical values which can conveniently be used to compare and evaluate the respective stabilization efficiency of different stabilizing procedures.

In the application of the above test to commercial practice an alkylate is considered to be completely stabilized when the amount of gas collected between 30 and 120 minutes ($\Delta 120$–$30$) is zero. In strongly acidic alkylates, however, substantial dealkylation may take place in the first 30 minutes, in which case the amount of gas collected during the next 90 minutes may be small. Thus in evaluating the stabilization efficiency of a particular stabilizing process the $\Delta 120$–$30$ value should be considered in connection with the volume of gas collected during the first 30 minutes. For instance, a 10 gram portion of an acidic di-tertiary-butyl cresol may have a $\Delta 120$–$30$ value as low as 90, but the volume of gas given off in the first 30 minutes may be as much as 1750 cc., indicating almost complete dealkylation. Theoretically, a 10 gram portion of a di-tertiary-butyl cresol should upon dealkylation produce about 1900 cc. of isobutylene.

Even with stabilized alkylates some gas is collected at the start of the test as a result of the expansion of air dissolved in, or introduced along with, the sample, and also from expansion of residual moisture contained in the alkylate. To determine what portion of the initial gas collected may result from the expansion of air in the heating zone of the dealkylation apparatus, a 10 gram sample of pure 2,6-di-tertiary-butyl para-cresol was introduced and heated.

At the end of 120 minutes, 40 cc. of gas had collected. The 40 cc. of gas collected is thus considered to be a measure of the air introduced into the system along with the sample. To determine what portion of the initial gas may result from the combined air and moisture content, a 10 gram sample of alkylate was treated by refluxing for several hours in 100 grams of absolute alcohol containing 10 grams of potassium hydroxide. The alkylate was then water-washed and allowed to stand overnight in a desiccator containing $P_2O_5$. A measurement in the dealkylation apparatus showed 120.0 cc. of gas evolved in 30 minutes and 137.0 cc. at the end of 120 minutes. The 137 cc. of gas is considered to correspond to the air and moisture content introduced with the sample. Accordingly, in the following examples gas volumes higher than about 140 cc. may be considered to be isobutylene.

The following specific examples illustrate by means of the above test the advantageous results obtained by treating an acidic phenol alkylate with at least 1.5 times the theoretical amount of an alkali metal phenate necessary to neutralize the alkylated phenol. In these examples the alkylate was obtained by alkylating a close-boiling meta-para-cresol mixture with the isobutylene contained in a refinery $C_4$ cut using 5 per cent of concentrated sulfuric acid as the catalyst. The alkylate thus obtained had a saponification number of 15.1. The alkylated derivatives of the cresols do not react with, and are not soluble in, dilute aqueous alkali solutions; therefore, this saponification number is considered to be an accurate indication of the non-phenolic acidic material present in the alkylate. Likewise, in the following examples the saponification numbers of the alkylated cresols are an accurate measurement of the non-phenolic acidic material present. The theoretical amount of sodium cresylate required to effect neutralization of a 10 gram portion of the alkylate calculated from the saponification number is 0.350 gram. Prior to the dealkylation test, separate portions of the alkylate were treated with the indicated amounts of sodium cresylate at 90° to 95° C. with stirring for 30 minutes. The results obtained when the treated alkylate was subjected to the dealkylation test are given in the following table:

| Example No. | Wt. Sodium Cresylate per 10 gm. Alkylate | Times Theoretical | Gas Collected (cc.) | | | Δ120–30 |
|---|---|---|---|---|---|---|
| | | | 30 min. | 60 min. | 120 min. | |
| 1 | 0.394 | 1.1 | 1,000.0 | 1,155.0 | 1,217.0 | 217.0 |
| 2 | 0.434 | 1.2 | 1,010.0 | 1,191.0 | 1,260.0 | 250.0 |
| 3 | 0.513 | 1.5 | 147.0 | 147.0 | 147.0 | 0.0 |
| 4 | 0.591 | 1.7 | 136.0 | 136.0 | 136.0 | 0.0 |

It can be seen from the above data that substantial dealkylation occurred when only 1.1 and 1.2 times the theoretical amount of sodium cresylate required to effect neutralization were used, and that substantially no deakylation occurred when 1.5 and 1.7 times the theoretical amount of sodium cresylate were used.

The effectiveness of the treating procedure of the present invention as compared with other procedures can best be shown in tabular form as follows:

| Treatment | Gas Collected (cc.) | | | Δ120–30 |
|---|---|---|---|---|
| | 30 min. | 60 min. | 120 min. | |
| Alkylate washed 6 times with water at room temperature | 1,750.0 | 1,840.0 | 1,840.0 | 90.0 |
| Alkylate washed with excess aqueous 10 percent NaOH and then with water at room temperature | 1,750.0 | 1,870.0 | 1,870.0 | 120.0 |
| Alkylate washed with excess 5 percent NaOH at 250° F. and 40 pounds per square inch | 270.0 | 322.0 | 416.0 | 146.0 |
| Alkylate treated with 1.5 times the theoretical amount of sodium cresylate at 90° to 95° C. for 30 minutes | 147 | 147 | 147 | 0 |

It can be seen from the above that practically complete dealkylation occurred when the alkylate was washed either with water or excess aqueuos 10 per cent NaOH and water. While washing the alkylate with excess aqueous 5 per cent NaOH at 250° F. and 40 pounds' pressure gave remarkably improved results with respect to dealkylation, it did not bring about complete stabilization, as evidenced by the Δ120–30 value of 146. When the alkylate was treated in accordance with our invention with at least 1.5 times the theoretical amount of an alkali metal phenate, sodium cresylate, more striking results were obtained in that substantially complete stabilization was effected, as evidenced by a Δ120–30 value of zero. The 147 cc. of gas collected from the alkylate treated in accordance with our invention is considered to result largely from the air and moisture introduced with the sample.

While the invention has been described herein with particular reference to certain embodiments and specific examples by way of illustration, it is to be understood that the invention is not limited to such embodiments and specific examples except as hereinafter defined in the appended claims.

We claim:

1. A method of inhibiting the dealkylation of crude acidic alkylated phenols at elevated temperatures which comprises adding to the alkylated phenols and maintaining therein at least 1.5 times the stoichiometric quantity of an alkali metal phenate necessary to neutralize the extraneous non-phenolic acidic matter in said alkylated phenols.

2. A method of inhibiting the dealkylation of crude acidic alkylated phenols at elevated temperatures which comprises adding to the alkylated phenols and maintaining therein at least 1.5 times the stoichiometric quantity of sodium cresylate necessary to neutralize the extraneous non-phenolic acidic matter in said alkylated phenols.

3. In the process of separating crude acidic alkylated phenols by fractional distillation, the improvement which comprises adding to the alkylated phenols and maintaining therein during the distillation thereof at least 1.5 times the stoichiometric quantity of an alkali metal phenate necessary to neutralize the extraneous non-phenolic acidic matter in said alkylated phenols.

4. In the process of fractionally distilling crude acidic alkylated phenols, the steps which comprise intimately contacting at a temperature between room temperature and the normal de-alkylating temperature said alkylated phenols with at least 1.5 times the stoichiometric quantity of an alkali metal phenate necessary to neutralize the extraneous non-phenolic acidic matter in said alkylated phenols and thereafter distilling said alkylated phenols in the presence of said phenate.

5. A method of stabilizing an acidic cresol alkylate which comprises adding to said alkylate and maintaining therein at least 1.5 times the stoichiometric quantity of sodium cresylate necessary to neutralize the extraneous non-phenolic acidic matter in said alkylate.

DONALD R. STEVENS.
SAMUEL C. CAMP.

References Cited in the file of this patent

UNITED STATES PATENTS

| Number | Name | Date |
|---|---|---|
| 1,931,057 | Clemmensen | Oct. 17, 1933 |
| 2,050,188 | Lee | Aug. 4, 1936 |
| 2,125,961 | Shoemaker | Aug. 9, 1938 |
| 2,302,600 | Cislak | Nov. 17, 1942 |
| 2,310,663 | Weinrich | Feb. 9, 1943 |
| 2,393,154 | Franklin | Jan. 15, 1946 |
| 2,529,209 | Ayo | Nov. 7, 1950 |